(12) United States Patent
Mori et al.

(10) Patent No.: US 6,527,666 B1
(45) Date of Patent: Mar. 4, 2003

(54) TOROIDAL TYPE CONTINUOUSLY VARIABLE TRANSMISSION AND METHOD FOR MANUFACTURING TRUNNION

(75) Inventors: Haruhito Mori, Kawasaki (JP); Toshifumi Hibi, Yokosuka (JP); Masatoshi Fukuyama, Fuji (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/669,736

(22) Filed: Sep. 26, 2000

(30) Foreign Application Priority Data

Sep. 27, 1999 (JP) ............................................ 11-271845

(51) Int. Cl.⁷ ............................................... F16H 15/38
(52) U.S. Cl. ................................ 476/40; 476/42; 476/46
(58) Field of Search ................................. 476/40, 42, 46

(56) References Cited

U.S. PATENT DOCUMENTS

| | | | |
|---|---|---|---|
| 5,538,483 A | * | 7/1996 | Kobayashi et al. ............ 476/42 |
| 5,951,435 A | | 9/1999 | Imanishi et al. |
| 6,174,259 B1 | * | 1/2001 | Nakano ......................... 476/40 |

FOREIGN PATENT DOCUMENTS

| | | |
|---|---|---|
| JP | 7-174201 | 7/1995 |
| JP | 07-22546 | 8/1995 |
| JP | 08-047822 | 2/1996 |
| JP | 10-169742 | 6/1998 |
| JP | 10-205599 | * 8/1998 |
| JP | 11-201250 | * 7/1999 |
| JP | 11-230291 | * 8/1999 |
| JP | 2000-230615 | * 8/2000 |

* cited by examiner

*Primary Examiner*—William C Joyce
(74) *Attorney, Agent, or Firm*—Foley & Lardner

(57) ABSTRACT

A toroidal type continuously variable transmission includes trunnions (4) formed with shoulder portions (40) which oppose an upper link (5) and a lower link (6), and projections (50) on the links (5, 6) which can slide on the shoulder portions (40) when the links (5, 6) perform swinging movement. Along with forming the trunnions (4) in single units by forging, step portions (4B) are arranged between the shoulder portions (40) and sloping portions (45) of the offset portions (4A). Planar portions (40A) are formed in the shoulder portions (40) which can slide on the projections (50) by cutting or grinding so that their radiuses R from the rotation axes (4C) up to the end portions of the step portions (4B) are set in advance.

4 Claims, 10 Drawing Sheets

TOROIDAL TYPE CONTINUOUSLY VARIABLE TRANSMISSION AND METHOD FOR MANUFACTURING TRUNNION

FIELD OF THE INVENTION

This invention relates to a toroidal type continuously variable transmission (referred to hereafter as CVT) used in a vehicle or the like, and to a method for manufacturing a trunnion thereof.

BACKGROUND OF THE INVENTION

Japanese Patent Laying Open Publication Heisei 7-174201 published in 1995 discloses the CVT. In this CVT, mutually opposed power rollers are interposed and held between coaxially disposed input and output disks. Further, trunnions which support the shafts of these power rollers are supported so as to be capable of displacement in the axial direction as well as rotatable around their axes.

SUMMARY OF THE INVENTION

With this type of the CVT, the upper ends and the lower ends of the trunnions, which are provided as mutually opposed, are respectively connected together by an upper link and a lower link. Due to this, when a trunnion is displaced along its axial direction, the upper link and the lower link execute swinging movement. At this time, shoulder portions formed upon the trunnions and projecting portions on the upper link or on the lower link may come into contact with one another.

The trunnions are formed by forging. The shoulder portions of the trunnions are formed in predetermined planes by performing a cutting process along the axes of the trunnions.

However, due to dimensional tolerances for the trunnions, it may be the case that the radiuses of the shoulder portions are not equal. Variation may be engendered in each of the trunnions due to sliding resistance caused when the projecting portions and the shoulder portions come into mutual contact. Accordingly, the problem has occurred of hysteresis being engendered in the speed changing characteristic due to variation of the sliding resistance acting in the directions of gyration of the power rollers, which causes deterioration in the accuracy of speed change control.

The objective of the present invention is to prevent the occurrence of hysteresis in the speed change characteristic by rendering uniform the contact condition of the links and the shoulder portions of the trunnions.

In order to achieve above object, this invention provides a toroidal type continuously variable transmission, comprising: a rotation input shaft; an input disk arranged coaxially with the rotation input shaft and is driven thereby; an output disk which is arranged coaxially with the rotation input shaft and opposes said input disks; a pair of trunnions arranged in opposite positions on both sides of the rotation input shaft, each of said trunnions having an axial direction and comprising rotation shafts formed at both end portions of the trunnion, and offset portions which are offset by a predetermined amount from said rotation shafts between the rotator shafts of the trunnions; an actuator which drives each pair of the trunnions in mutually opposite axial direction of the trunnions; power rollers which are supported by said trunnions and are gripped between said input disk and said output disk; links each of which is respectively formed with aperture portions into which said respective rotation shafts of said trunnions are inserted; and spherical joints provided between the outer peripheries of said rotation shafts and said aperture portions; and wherein said trunnions are formed by forging, and shoulder portions of said trunnions which oppose said links and step portions which define outer ends of said shoulder portions are formed by cutting, and said links having projections which contact slidably into said shoulder portions according to swinging movement of said links.

Further this invention provides a method for manufacturing a trunnion of a toroidal type continuously variable transmission, trunnion comprising rotation shafts formed at both ends of said trunnion, and offset portions which connect said rotation shafts with links and locate between said rotation shafts and offset from said rotation shafts; wherein said trunnion is formed by forging, and steps which define the outer ends of said shoulder portions opposing said links are formed in said trunnion by cutting.

DESCRIPTION OF THE PREFERRED EMBODIMENTS

Figure 1:
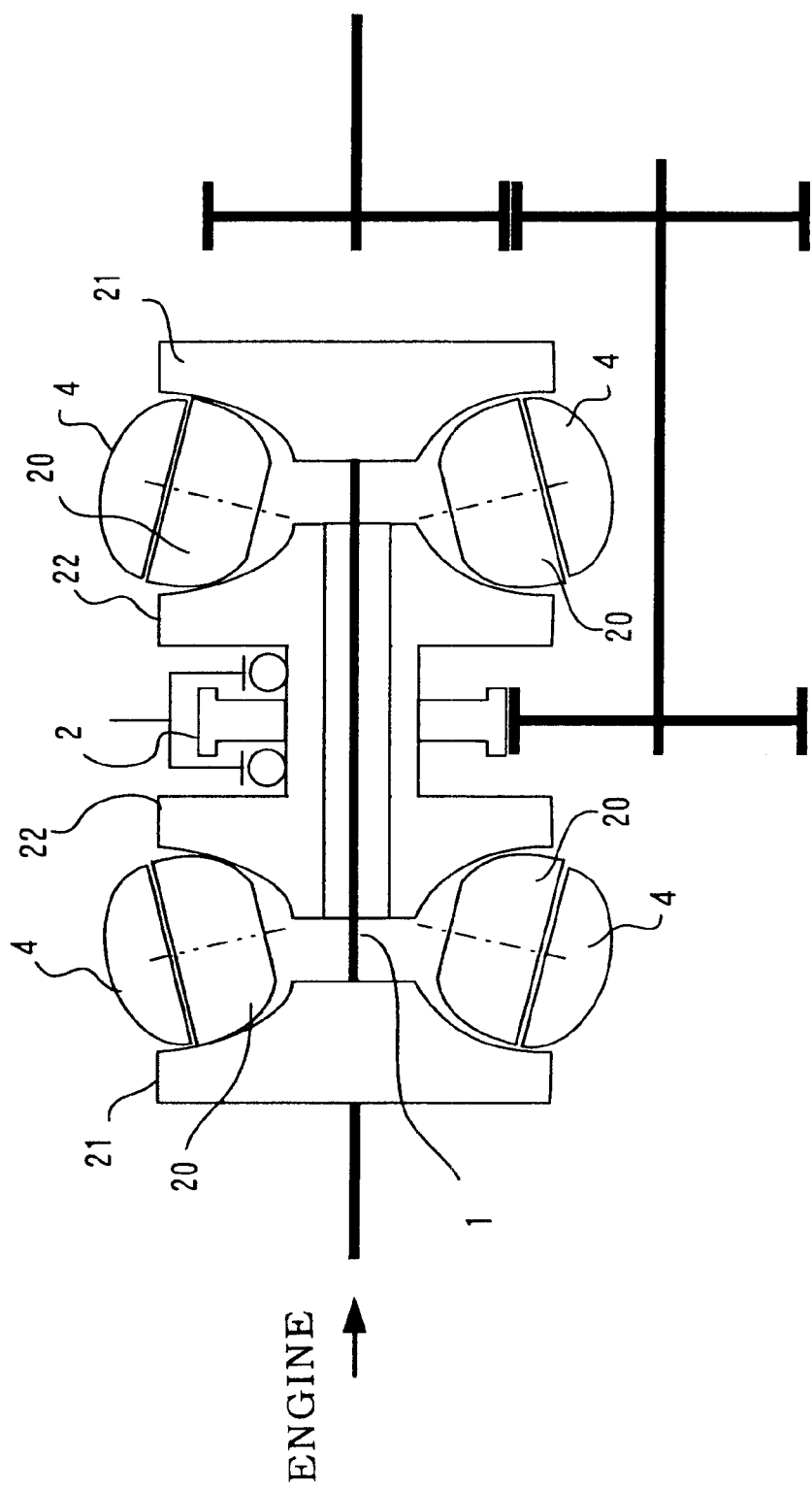
FIG. 1 is an outline view of a CVT according to this invention.

Referring to FIG. 1, the CVT comprises two pairs of input disks 21 and output disks 22. Two pairs of power rollers 20 are gripped between each of the input disks 21 and the output disks 22. Next, referring to FIG. 2, each of the power rollers 20 is supported upon a trunnion 4 via a pivot shaft 24. An upper link 5 and a lower link 6 are respectively connected to the opposite upper and lower ends of each of the trunnions 4.

Next, referring to FIG. 1, the pair of input disk 21 and the output disks 22 is coaxially mounted upon an input shaft 1. The input disks 21 are rotationally driven by the input shaft 1. The power rollers 20 transmit the rotation of the input disks 21 to the output disks 22. The rotation of the output disks 22 is transmitted to the driving wheels via an output gear 2.

Although this toroidal type continuously variable transmission of the present invention is a CVT of the half toroidal type which has a double cavity, the present invention can also be applied to other types of toroidal type continuously variable transmission, for example to a single cavity type toroidal type continuously variable transmission.

Figure 2:
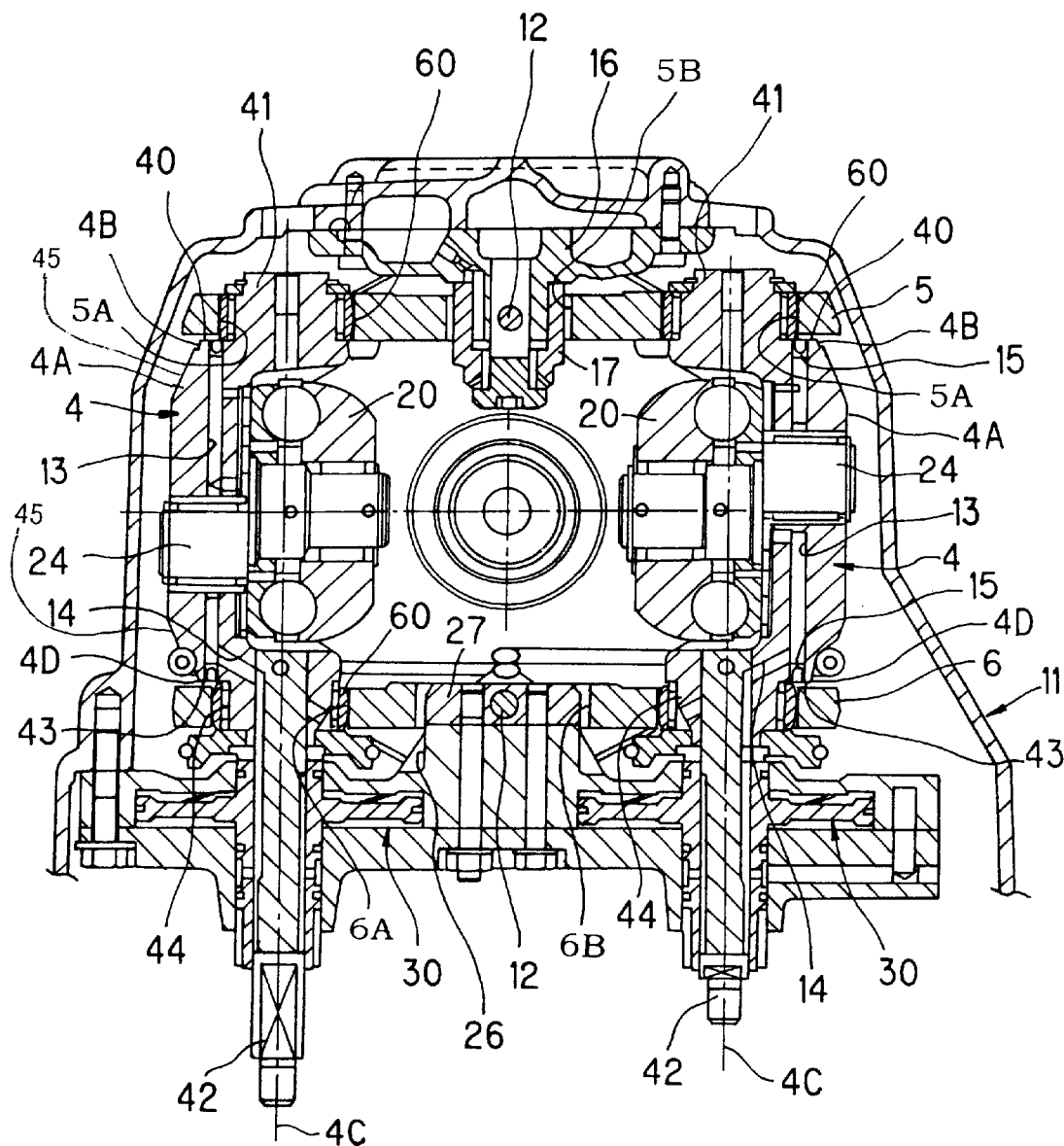
FIG. 2 is a vertical sectional view of the CVT according to this invention.

Referring to FIG. 2, the pair of trunnions 4 is arranged on either side of the input shaft 1 of the input disks 21 and the output disks 22. The trunnions 4 freely rotatably support the power rollers 20 via pivot shafts 24 which are capable of individual swinging movement. The trunnions 4 are supported by the upper links 5 and lower links 6 so that their respective positions can be changed both in the axial directions of, and around, their respective rotation axes 4C.

And rods 42 are connected to the lower ends of the trunnions 4. Each of the rods 42 is driven in the upwards and downwards direction by a hydraulic cylinder 30. When the trunnion is displaced in the upwards and downwards direction, the power rollers 20 are rotationally displaced around the rotation axes 4C. This displacement will be termed "gyration". The result of gyration is that the contact radiuses between the power rollers 20 and the input disks 21 and the output disks 22 change, so that the speed change ratio changes continuously.

Accompanying the transmission of torque by the power rollers 20, the input disks 21 and the output disks 22 exert thrust forces upon the power rollers 20 in directions away from the input shaft 1. In opposition to these thrust forces, the upper links 5 and the lower links 6 keep the distance between the rotation axes 4C of the trunnions 4 almost constant.

Figure 3:
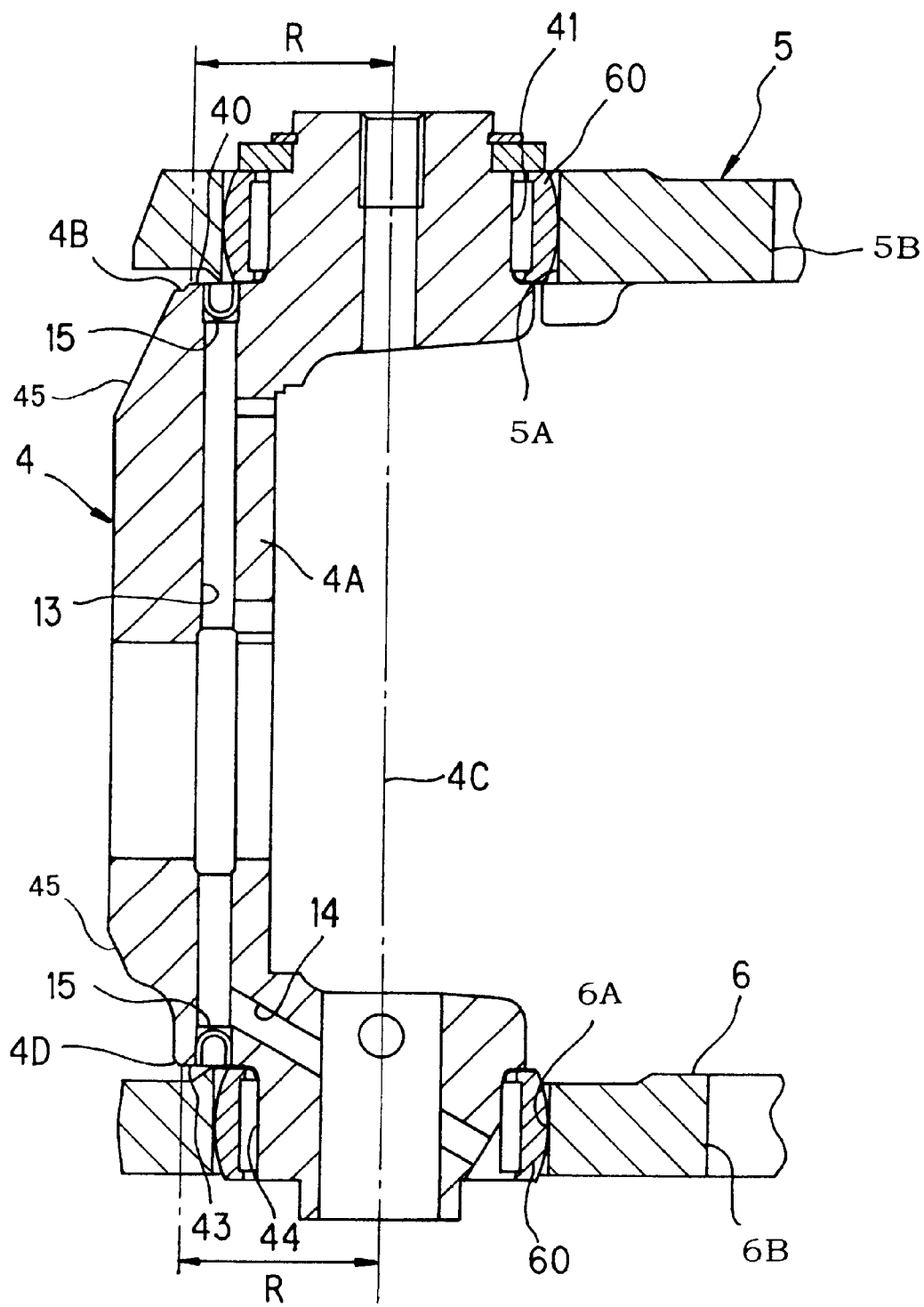
FIG. 3 is a vertical sectional view of a trunnion according to this invention.
Figure 4:
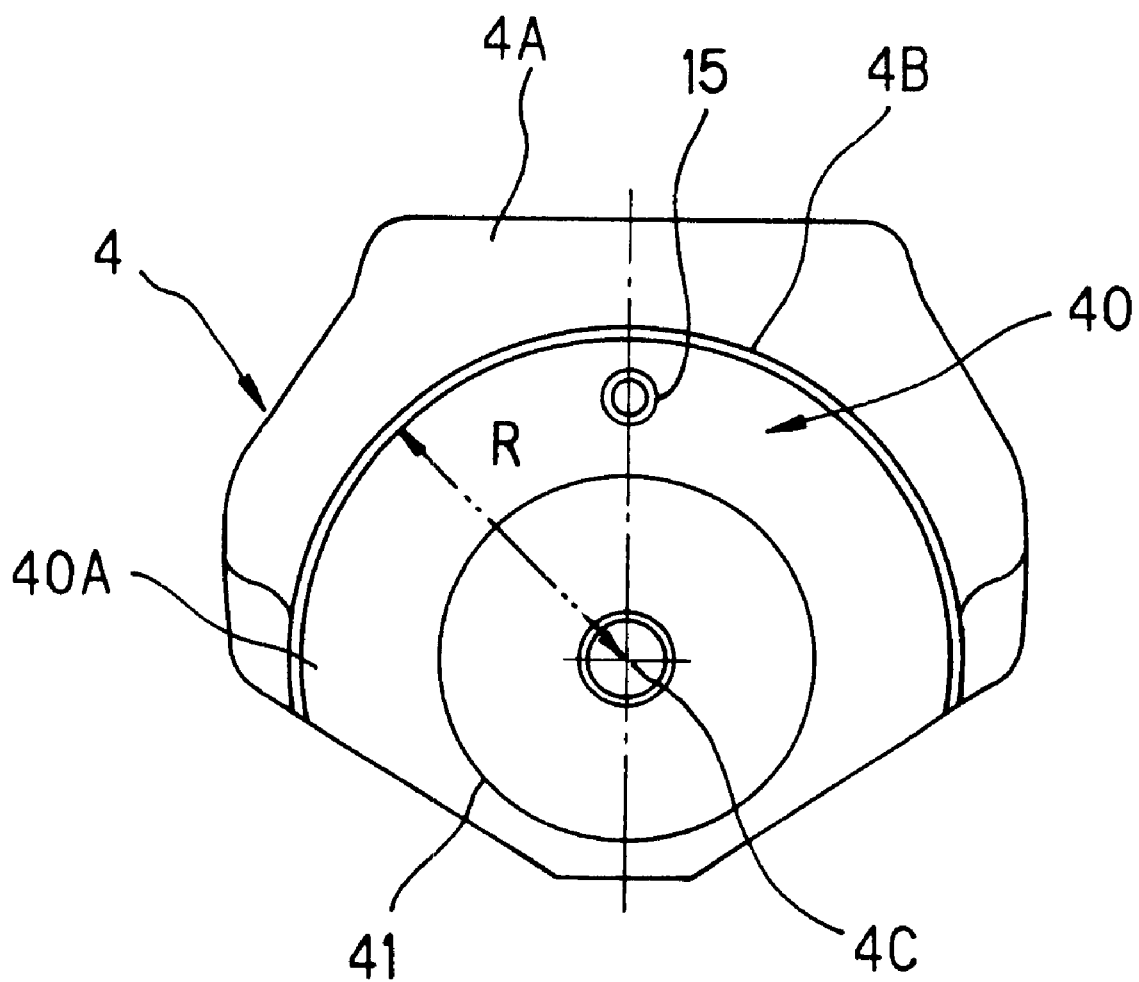
FIG. 4 is a plan view of an upper portion of the trunnion according to this invention.
Figure 5:
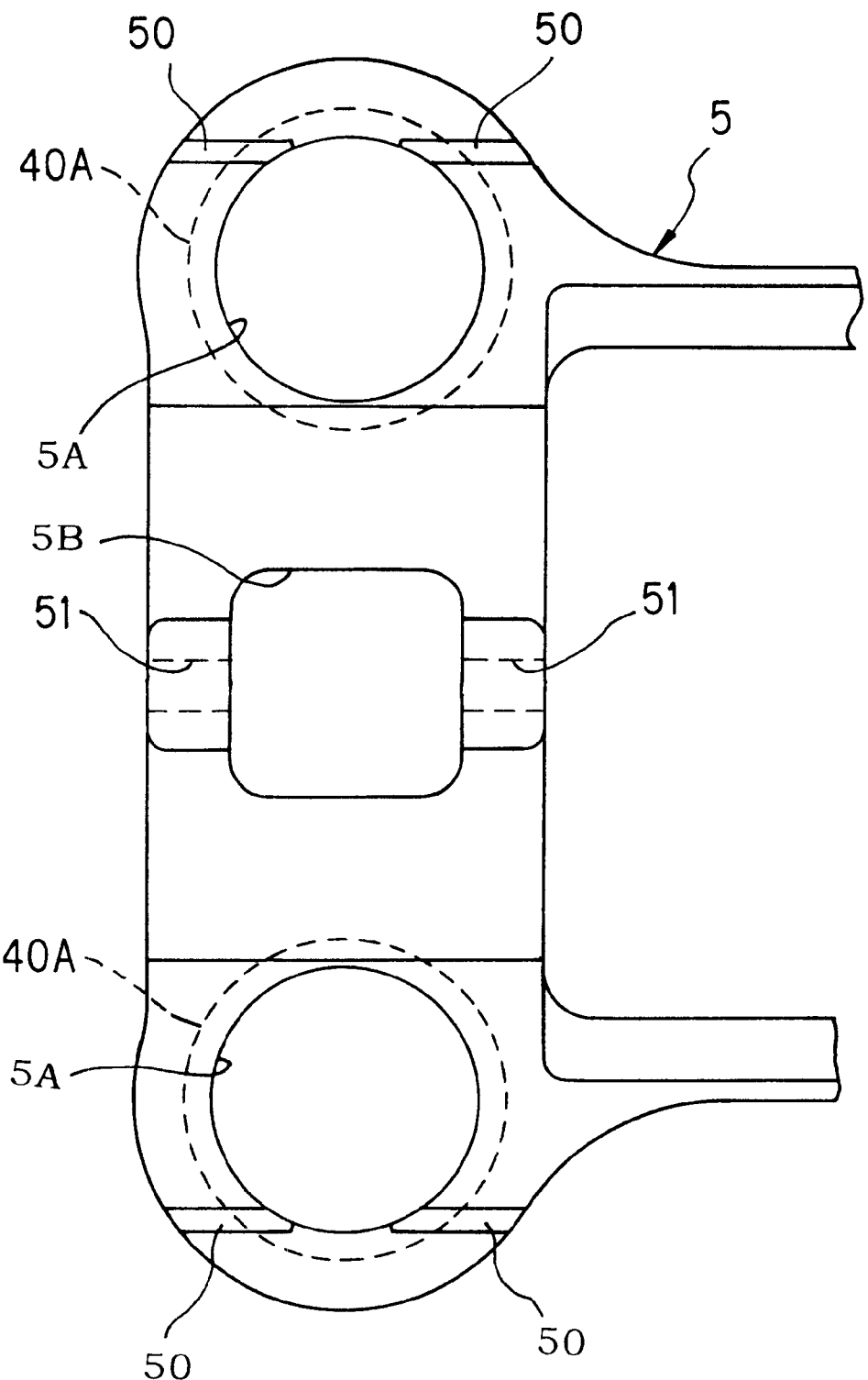
FIG. 5 is a bottom view seen of an upper link according to this invention.

Referring to FIG. 2, FIG. 3, and FIG. 5, a through hole 5B is formed in the central portion of the upper link 5. The upper link 5 is connected via a pin 12 to an upper link post (support member) 17 which passes through the through hole 5B. Further, the upper link post 17 is connected to a post base 16 which is fixed to an upper inner circumferential portion of the casing 11.

The pin 12 is provided so as to project from the upper link post 17 in parallel with the input shaft 1. Referring to FIG. 5, the pin 12 engages with a pin hole 51 which is formed in the upper link 5 in parallel with the input shaft 1. In this manner, the upper link 5 is supported upon the upper link post 17 so as to be capable of swinging movement.

On the other hand, through holes (aperture portion) 5A are formed in the both side of through hole 5B of the upper link 5. Shafts 41, which project upwards in FIG. 2 from shoulder portions 40 provided at the upper ends of the trunnions 4, are passed through the through holes 5A. Furthermore, spherical joints 60 with spherical surfaces shown in FIG. 3 are fitted around the outer surfaces of these shafts 41. The trunnions 4 and the upper link 5 are connected together via the spherical joints 60. It should be understood that the spherical joints 60 comprise needle roller bearings around their inner surfaces.

On the other hand, a through hole 6B is formed in the central portion of the lower link 6. The lower link 6 is connected via a pin 12 to a lower link post 27 which passes through the through hole 6B. Further, the lower link post 27 is connected to the housing 11 via a post base 26 and a housing of the hydraulic cylinder 30.

The pin 12 is provided so as to project from the lower link post 27 in parallel with the input shaft 1. The pin 12 engages with a pin hole which is formed in the through hole 6B of the lower link 6. In this manner, the lower link 6 is supported upon the lower link post 27 so as to be capable of swinging movement.

Through holes 6A are formed at both sides of the through hole 6B of the lower link 6. Shafts 44, which project in the downward direction in FIG. 2 from shoulder portions 43 which are formed on the lower end portions of the trunnions 4, are passed through the through holes 6A. Spherical joints 60 with spherical surfaces are fitted around the outer surfaces of these shafts 44. The inner surfaces of the spherical joints 60 are contacted to the shafts 44 via needle roller bearings, and their outer peripheries which are formed as curved surfaces are contacted to the inner surfaces of the through holes 6A.

Moreover, the rods 42 which connect the trunnions 4 and the hydraulic cylinders 30 are engaged with the inner peripheral end portions of the shafts 44.

By doing this, the two trunnions 4 which are connected to the upper link 5 and the lower link 6 are displaced in opposite directions along the axial direction. Further, the trunnions 4 are allowed by the spherical joints 60 to rotate around the rotation axes 4C.

Next, the structure of the upper link 5 and the lower link 6 will be explained with reference to FIG. 5. It should be understood that the following explanation will only consider the upper link 5, because the upper link 5 and the lower link 6 are of identical structure.

Referring to FIG. 5, projections 50 are provided on the outer sides of each of the through holes 5A on the under surface of the upper link 5 which oppose the shoulder portions 40 of the trunnions 4. The projections 50 are provided as collinear and approximately parallel to and separated by a predetermined distance from the pins 12. Each of the projections 50 is divided into two portions by its corresponding through hole 5A. The projections 50 are able to contact slidably upon the shoulder portions 40 of the trunnions 4.

Furthermore, projections 50 are formed in the same manner as above in the through holes 6A of the lower link 6 as well, so as to be capable of sliding upon the shoulder portions 43 of the trunnions 4.

Referring to FIG. 3, the trunnions 4 are of generally U-shaped form in vertical section, being made up from offset portions 4A and the shafts 41 and 44. The base ends of the pivot shafts 24, which are bent into cranked shapes, are supported by the offset portions 4A so as to be capable of swinging movement. The horizontal shoulder portions 40 and 43 and sloping portions 45 are formed at the upper and lower end portions of the offset portions 4A.

Figure 6:
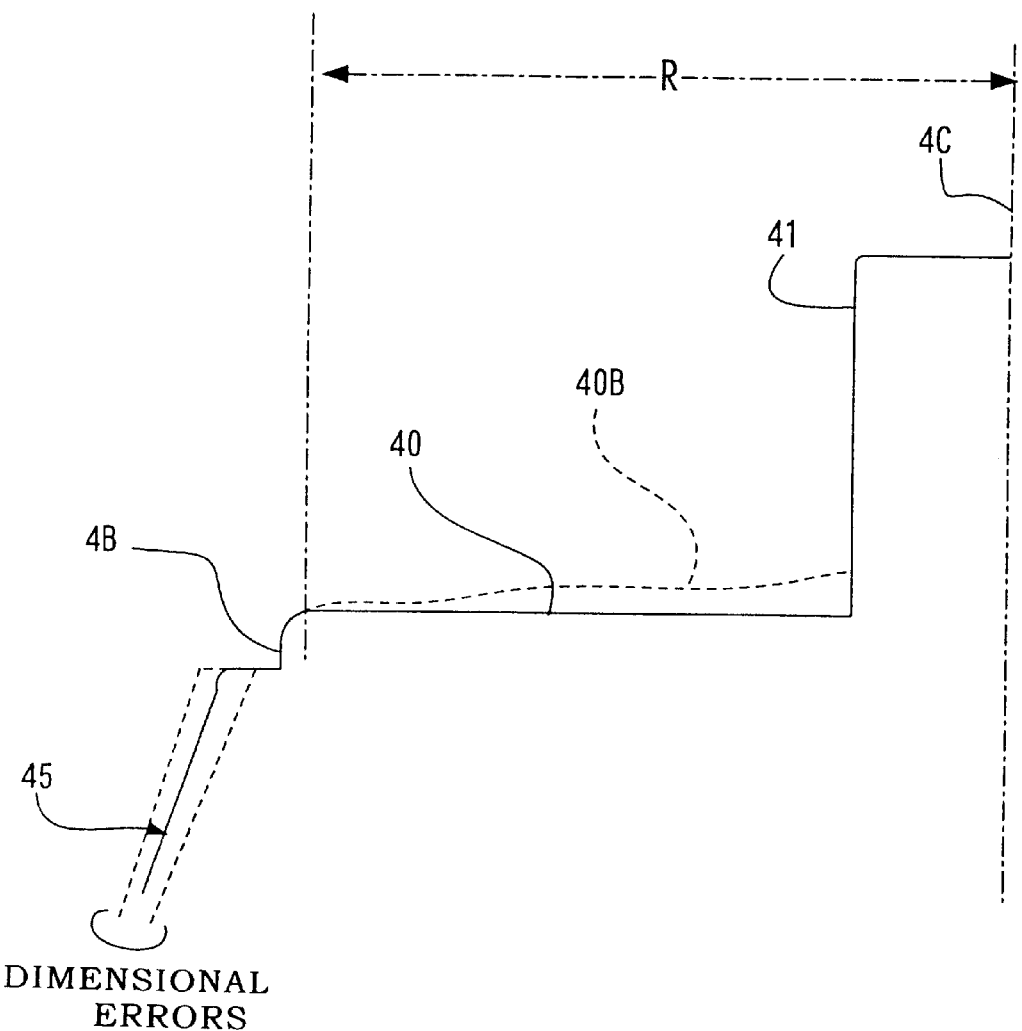
FIG. 6 is an enlarged sectional view of a shoulder portion of a trunnion according to this invention.

Referring to FIG. 6, the horizontal shoulder portions 40 and steps 4B and sloping portions 45 are formed at the upper ends of the offset portions 4A. After forging of the trunnions 4, the steps 4B are formed at positions of radius R from the rotation axes 4C of the shafts 41 by cutting or grinding. By providing the steps 4B between the shoulder portions 40 and the sloping portions 45, it is possible to make the radius of the shoulder portions 40 constant, irrespective of dimensional errors as shown in the figure by the broken lines when forging the sloping portions 45.

On the other hand, the forged faces 40B of the shoulder portions 40 shown by broken lines are formed into horizontal planes by cutting or grinding.

In this manner, the horizontal shoulder portions 43 and the steps 4D are formed on the lower ends of the offset portions 4A. Although it is not so shown in the figure, for the lower ends of the offset portions as well, it is possible to equalize the radiuses of the shoulder portions 43 at constant value R, in the same manner as the shoulder portions 40, irrespective of dimensional errors during forging of the sloping portions 45, by a process identical to the upper ends of the offset portions.

Figure 7:
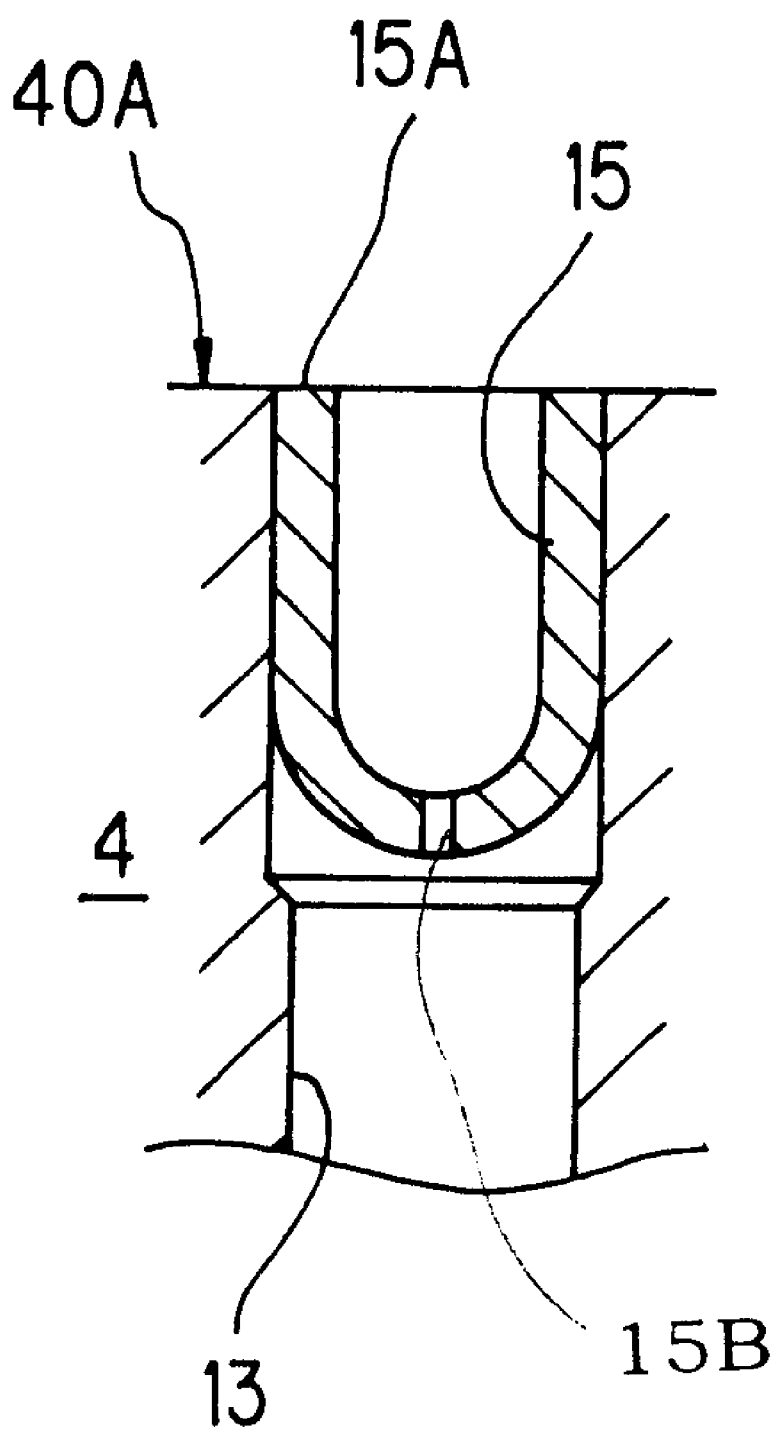
FIG. 7 is an enlarged sectional view of an orifice provided to a trunnion according to this invention.

Next, referring to FIG. 3, oil conduits 13 are formed inside the offset portions 4A, so as to be parallel with the rotation axes 4C. The upper ends of the oil conduits 13 open to the planar portions 40A of the shoulder portions 40. On the other hand, the lower ends of the oil conduits 13 open to the planar portions 40A of the shoulder portions 43. Referring to FIG. 7, orifices 15 as plug shaped members are pressed into these opening portions. Lubrication of the spherical joints 60 and the projections 50 is performed by injecting oil from these orifices 15.

Referring to FIGS. 2 and 3, the oil conduits 13 connect to oil conduits 14 which open to the side faces of the shafts 44. The oil conduits 14 receive supply of oil from distribution conduits not shown in the figures.

In this manner, with the present invention, on the one hand the step portions 4B are provided between the sloping portions 45 for which variation in the slant angle due to forging occurs and the shoulder portions 40, and furthermore the forged faces 40B are formed by cutting or grinding. Accordingly, the shoulder portions 40 are formed so as to have constant radius R without any relation to dimensional errors during forging of the sloping portions 45. As a result, each of the projections 50 formed on the lower surface of the side of the upper link 5 contact slidably into the planar portion 40A of the shoulder portion 40 of the corresponding trunnion 4. Accordingly, the sliding resistance between the projections 50 and the shoulder portion 40 is constant for both of the trunnions, and it becomes possible to reduce the hysteresis in the speed changing characteristic.

Figure 8:
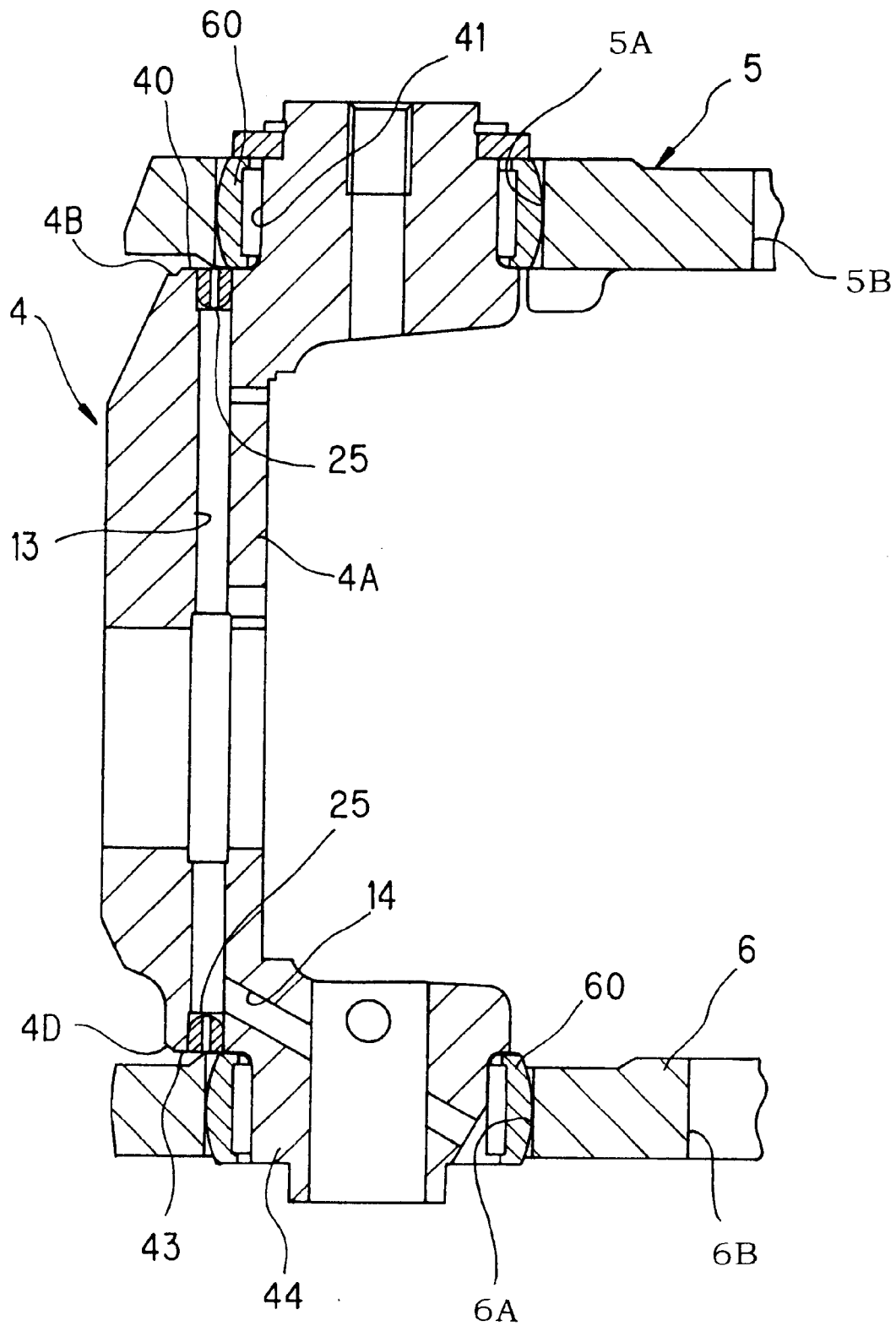
FIG. 8 is similar to FIG. 3, but shows a second embodiment of this invention, and is a vertical sectional view of a trunnion.

A second embodiment of the present invention will now be described with reference to FIG. 8 through FIG. 10. In this case, instead of the orifices 15 which were used in the first embodiment described above, plugs 25 provided with throttles 25C are positioned at both opening end portions of the oil conduits 13. The remainder of the construction is identical to the first embodiment.

The throttles 25C are formed as the inner circumferences of the plugs 25. Further, the outer circumferential surfaces of the plugs 25 have end portions 25L which are provided with tapers, and end portions 25U which have planar end surfaces. These plugs 25 are pressed into both the ends of the oil conduits 13 which open to the shoulder portions 40 and 43 of the trunnions 4, with their tapered end portions 25L inwards.

Here, the end portions 25U of the plugs 25 are provided with planar end surfaces. Before performing the processing of the planar portions 40A of the shoulder portions 40 and 43, the end portions 25U are previously pressed inwards towards the upper surface of the shoulder portion 40 and the lower surface of the shoulder portion 43.

Figure 9:
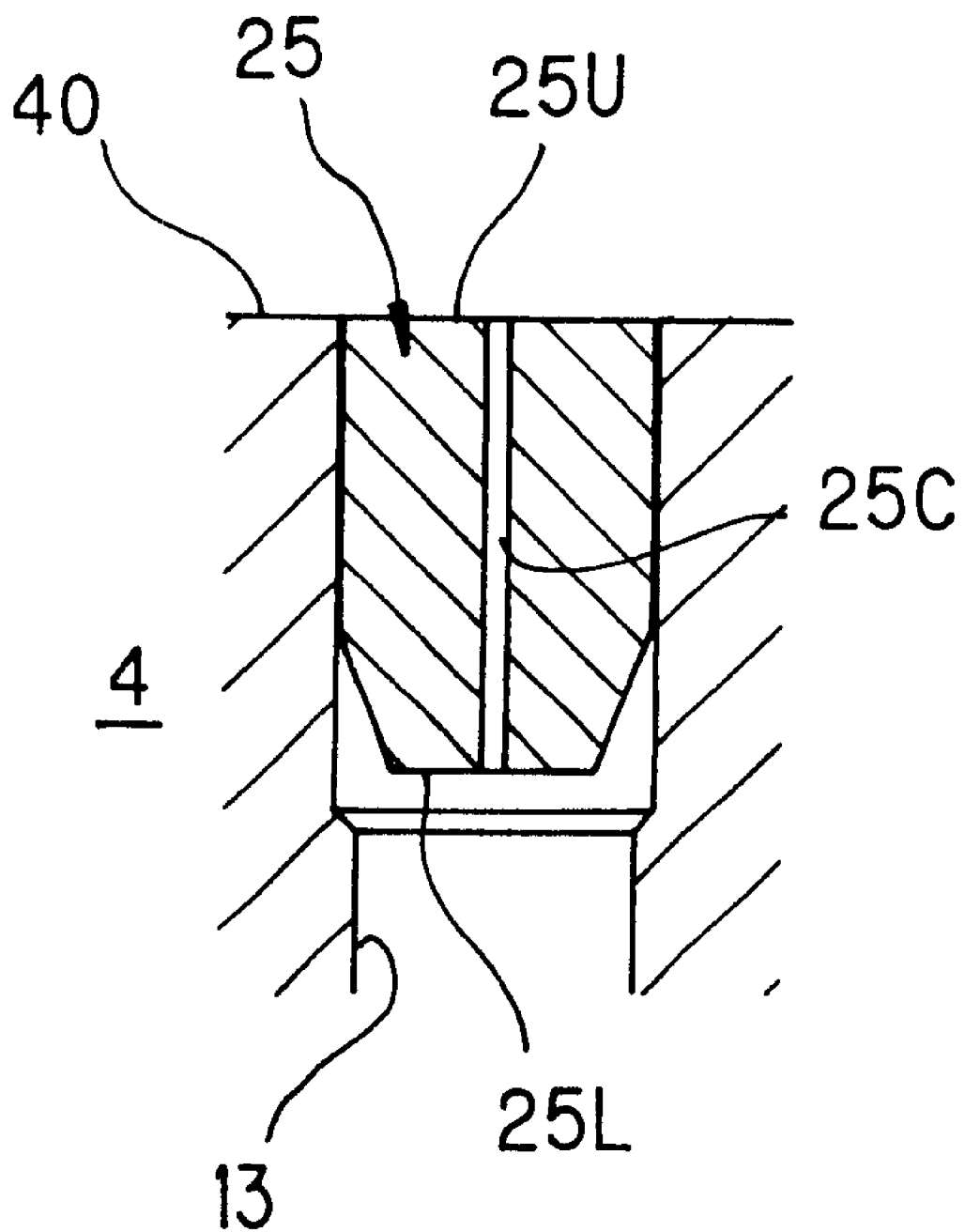
FIG. 9 is similar to FIG. 5, and is a bottom view of an upper link according to the second embodiment.

And when processing the planar portions 40A by cutting or grinding the forged surfaces 40B, as shown in FIG. 9, the end portions 25U are ground along with the forged surfaces 40B. The end faces on the side of the end portions 25U of the plugs 25 which have been pressed into both the end opening portions of the oil conduits 13 are processed so as to become coplanar with the planar portions 40A of the shoulder portions 40 and 43.

Figure 10:
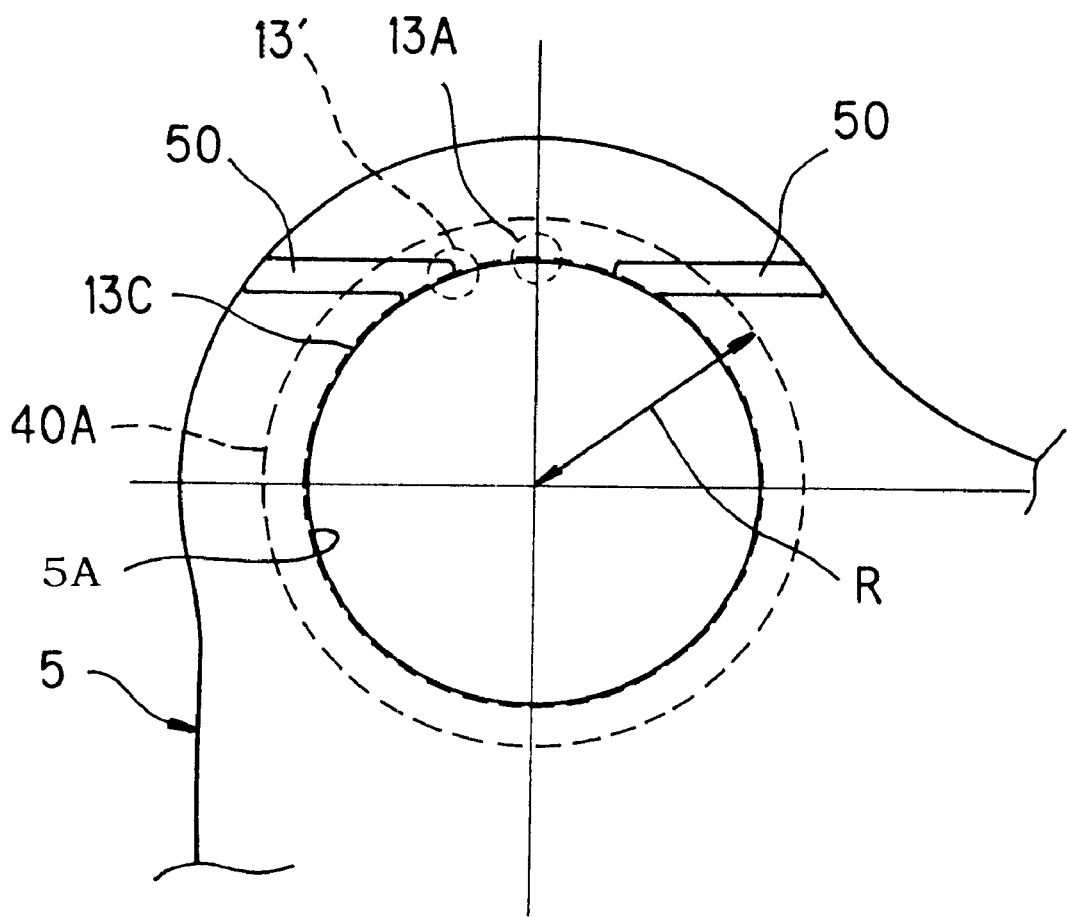
FIG. 10 is similar to FIG. 7, and is an enlarged sectional view of an orifice provided to a trunnion according to the second embodiment.

Here, as shown in FIG. 10, both the opening portions 13A of the oil conduits 13 open within the planar portions 40A of the shoulder portions 40 which contact slidably into the projections 50 of the upper link 5. When the trunnions 4 gyrate, they are relatively displaced along the line shown by 13C in the figure.

And, when the projections 50 contact slidably into the planar portions 40A along with the gyration of the trunnions, the end portions of the projections 50 approach to the opening portions 13A of the oil conduits 13, in the position shown in FIG. 10 by 13'.

At this time, the end portions 25U of the plugs 25 which have been pressed into the opening portions 13A lie in the same planes as the planar portions 40A. Accordingly, it is possible reliably to prevent the end portions of the projections 50 becoming caught up upon the opening end portions 13A, and furthermore to prevent the projections 50 riding up upon the plugs 25 which have been pressed in. Furthermore, the variation the sliding resistance which is generated between the shoulder portions 40 of the trunnions 4 and the projections 50 of the upper link 5 is prevented. Accordingly, the occurrence of hysteresis in the speed change characteristic is guarded against, and it becomes possible further to enhance the accuracy of speed change control. Yet further, since throttles 25C which are formed in the plugs 25 have the small radius, it is possible to perform lubrication of the spherical joints 60 and the projections 50 and the planar portions 40A, in the same manner as with the orifices 15 of the first embodiment described above.

Now, if orifices 15 of U-shaped cross section as shown in FIG. 7 for the first embodiment described above were pressed into the opening portions of the oil conduits 13 after processing of the planar portions 40A, then, if the orifices 15 were pressed in while being gyrated, their end portions 15A would project outwards from the planar portions 40A. Accordingly, when the projections 50 of the link passed the opening portions of the oil conduits 13, they could catch up upon the projecting end portions 15A or could ride up upon them. As a result, variation might be generated due to sliding resistance with the trunnions 4.

By contrast to this, the plugs 25 to which the small radius throttles 25C are provided are pressed in before the planar portions 40A are processed. When processing the planar portions 40A, the end portions 25U of the plugs 25 are simultaneously ground down, so as to be formed in the same planes therewith. Accordingly, even when the plugs 25 and the projections 50 rub together, they do not catch together or ride up upon one another. Consequently it is possible reliably to prevent the occurrence of variation in the sliding resistance of the plurality of trunnions 4.

It should be understood that although for FIG. 10 the explanation has been made in terms of the upper link 5, the same holds good for the rubbing of the projections 50 upon the lower link 6 upon the planar portions 40A of the shoulder portions 43. In other words, the end portions 25U of the plugs 25 which have been pressed into the lower end opening portions 13A of the oil conduits 13 are formed so as to be coplanar with the planar portions 40A. Accordingly the end portions of the projections 50 are reliably prevented from catching up upon the opening portions 13A, and the projections 50 are reliably prevented from riding up upon the projections 50.

By doing this, the oil conduits 13 which open in the shoulder portions 40 and 43 reliably prevent the generation of variation of resistance in the gyration direction of the trunnions 4 when the projections 50 rub against them, and accordingly it is possible reliably to prevent generation of hysteresis in the speed change characteristics of the toroidal type continuously variable transmission.

It should be noted that in the above described embodiment the projections 50 were described as being provided both upon the upper link 5 and upon the lower link 6, but this is only by way of example; in fact, projecting portions could be provided upon either one of the links, and in such a case it would be possible to anticipate reduction and evening out of the sliding resistance.

The contents of Japanese Application No. 11-271845, with a filing date Sep. 27, 1999, are hereby incorporated by reference.

The embodiments of this invention in which an exclusive property or privilege is claimed are defined as follows:

1. A toroidal continuously variable transmission, comprising:

a rotational input shaft;

an input disk arranged coaxially with said rotational input shaft and is driven thereby;

an output disk which is arranged coaxially with said rotational input shaft and opposes said input disk;

a pair of trunnions arranged in opposite positions on both sides of said rotational input shaft, each of said trunnions having an axial direction and comprising rotation shafts formed at both end portions of said trunnions, and offset portions, which are offset by a predetermined amount from said rotation shafts, between said rotation shafts of said trunnions wherein each trunnion is movable along and around the axial direction of the trunnion;

an actuator which drives each of said pair of trunnions in the mutually opposite axial direction of the trunnions;

power rollers which are supported by said trunnions and are gripped between said input disk and said output disk;

links each of which is respectively formed with aperture portions into which said respective rotation shafts of said trunnions are inserted; and spherical joints provided between the outer peripheries of said rotation shafts and said aperture portions, wherein said trunnions are formed by forging, and shoulder portions of said trunnions which oppose said links and step portions which define outer ends of said shoulder portions are formed by cutting to keep a respective radii of the shoulder portions constant, and said links having projections which contact slidably into said shoulder portions according to swinging movement of said links.

2. A toroidal type continuously variable transmission according to claim 1, wherein said offset portions provide oil conduits which supply lubricating oil to said spherical joints and open to said shoulder portions.

3. A toroidal type continuously variable transmission according to claim 2, wherein said offset portions further comprise plug shaped members which are formed with holes which function as orifices and are pressed into opening portions of said oil conduits to said shoulder portions.

4. A method for manufacturing a trunnion of a toroidal continuously variable transmission, the trunnion comprising rotation shafts formed at both ends of said trunnion, and an offset portion which connects said rotation shafts and is located between said rotation shafts and offset from said rotation shafts, the trunnion having a shoulder portion configured to engage a link that connects the trunnion to another trunnion, the method comprising the steps of:

forming said trunnion by forging; and cutting a step in the trunnion that defines an outer end of the shoulder portion of said trunnion that opposes said link to keep a radius of the shoulder portion constant.

* * * * *